US012621655B2

(12) United States Patent　　(10) Patent No.: US 12,621,655 B2
Hatada et al.　　　　　　　　　 (45) Date of Patent:　　　May 5, 2026

(54) COMMUNICATION DEVICE, MANAGEMENT DEVICE, COMMUNICATION METHOD, MANAGEMENT METHOD, AND COMPUTER PROGRAM

(71) Applicant: HONDA MOTOR CO., LTD., Tokyo (JP)

(72) Inventors: Takumi Hatada, Wako (JP); Tetsuya Matsuhisa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 316 days.

(21) Appl. No.: 18/115,009

(22) Filed: Feb. 28, 2023

(65) Prior Publication Data

US 2023/0300605 A1　　　Sep. 21, 2023

(30) Foreign Application Priority Data

Mar. 16, 2022　(JP) ................................. 2022-041222

(51) Int. Cl.
　　*H04W 8/00*　　　(2009.01)
　　*H04W 4/44*　　　(2018.01)
　　*H04W 8/24*　　　(2009.01)
(52) U.S. Cl.
　　CPC ............... *H04W 8/24* (2013.01); *H04W 4/44* (2018.02)
(58) Field of Classification Search
　　CPC ............ H04W 8/24; H04W 4/44; H04W 4/40
　　See application file for complete search history.

(56) References Cited

U.S. PATENT DOCUMENTS

2010/0332072 A1　12/2010　Ishiko et al.
2014/0071853 A1*　3/2014　Ohashi .............. H04W 52/0206
　　　　　　　　　　　　　　　　　　370/254

(Continued)

FOREIGN PATENT DOCUMENTS

CN　　　111993945　　　11/2020
DE　　112009000439　　　3/2011

(Continued)

OTHER PUBLICATIONS

Japanese Office Action for Japanese Patent Application No. 2022-041222 mailed Aug. 5, 2025.

(Continued)

*Primary Examiner* — Md K Talukder
(74) *Attorney, Agent, or Firm* — Amin, Turocy & Watson, LLP

(57)　　　　　ABSTRACT
A communication device including: a drive device communication unit that communicates with a drive device to which an own device is connected; an external communication unit that communicates with another device via a network; an identification information acquisitor that acquires type identification information indicating a type of a drive device from the drive device connected to the drive device communication unit; a setting information acquisitor that acquires, from another device, setting information corresponding to the type identification information by transmitting information including the type identification information to the another device via the external communication unit; and a communication controller that acquires information from the drive device on the basis of the setting information and transmits the information to a predetermined device.

13 Claims, 4 Drawing Sheets

(56)                    References Cited

U.S. PATENT DOCUMENTS

| | | | |
|---|---|---|---|
| 2016/0364921 A1 | 12/2016 | Iyoda et al. | |
| 2016/0371077 A1 | 12/2016 | Moeller et al. | |
| 2019/0116462 A1* | 4/2019 | Sagesaka | H04W 4/44 |
| 2019/0261223 A1* | 8/2019 | Miyamoto | H04L 7/0037 |
| 2019/0265966 A1 | 8/2019 | Shimomura | |
| 2020/0134937 A1 | 4/2020 | Ogawa et al. | |
| 2020/0384883 A1 | 12/2020 | Amari | |
| 2021/0297831 A1* | 9/2021 | Otaka | H04W 4/44 |
| 2022/0014928 A1* | 1/2022 | Yamaguchi | H04W 48/04 |
| 2022/0060351 A1 | 2/2022 | Grzegorczyk | |
| 2022/0141655 A1* | 5/2022 | Ha | H04W 4/40 |
| | | | 726/6 |
| 2023/0300605 A1* | 9/2023 | Hatada | H04W 4/44 |
| | | | 455/66.1 |

FOREIGN PATENT DOCUMENTS

| | | |
|---|---|---|
| DE | 102016110794 | 12/2016 |
| DE | 112017005384 | 8/2019 |
| JP | 2009-264770 | 11/2009 |
| JP | 2014-192561 | 10/2014 |
| JP | 6084128 | 2/2017 |
| JP | 2020-083138 | 6/2020 |
| JP | 2020-174256 | 10/2020 |

OTHER PUBLICATIONS

German Office Action for German Patent Application No. 102023104796.5 mailed Dec. 1, 2025.
Chinese Office Action for Chinese Patent Application No. 202310217083.9 mailed Jan. 10, 2026.

* cited by examiner

| COMMUNICATION DEVICE IDENTIFICATION INFORMATION | TYPE IDENTIFICATION INFORMATION |
|---|---|
| t001 | e001 |
| t002 | e002 |
| ⋮ | ⋮ |

| TYPE IDENTIFICATION INFORMATION | SETTING INFORMATION |
|---|---|
| e001, e002, e003 | conf1 |
| e011, e012, e013, e014 | conf2 |
| ⋮ | ⋮ |

FIG. 6

| DRIVE DEVICE IDENTIFICATION INFORMATION | FAILURE INFORMATION | AUXILIARY SETTING INFORMATION |
|---|---|---|
| exx001 | xx1 | yy1 |
| exx002 | xx2 | yy2 |
| ... | ... | ... |

COMMUNICATION DEVICE, MANAGEMENT DEVICE, COMMUNICATION METHOD, MANAGEMENT METHOD, AND COMPUTER PROGRAM

CROSS-REFERENCE TO RELATED APPLICATION

Priority is claimed on Japanese Patent Application No. 2022-041222, filed on Mar. 16, 2022, the content of which is incorporated herein by reference.

BACKGROUND OF THE INVENTION

Field of the Invention

The present invention relates to a communication device, a management device, a communication method, a management method, and a computer program.

Description of Related Art

In recent years, communication equipment called telematics control unit (TCU) has been proposed. The TCU is attached to various types of drive devices for an automobile and an agricultural work vehicle, and achieves communication with an external network (see, for example, Japanese Patent No. 6084128).

SUMMARY OF THE INVENTION

However, in order to perform control different depending on the type of the drive device, it is necessary to design and develop a dedicated TCU for each drive device. In this case, there is a risk of an increase in cost required for design, development, and manufacturing of the TCU. Such a problem is not limited only to the TCU, but is a problem common to any communication device connected to a drive device for an automobile and the like and performs communication with an external network.

An aspect according to the present invention has been made in view of the above problems, and an object of the present invention is to provide a communication device, a management device, a communication method, a management method, and a computer program that are capable of reducing the cost required up to manufacture a communication device that is connected to a drive device for an automobile and the like and communicates with an external network.

In order to solve the above problems and achieve the object, the present invention adopts the following aspect.

A communication device of an aspect according to present invention includes:

a drive device communication unit that communicates with a drive device to which an own device is connected;

an external communication unit that communicates with another device via a network;

an identification information acquisitor that acquires type identification information indicating a type of a drive device from the drive device connected to the drive device communication unit;

a setting information acquisitor that acquires, from another device, setting information corresponding to the type identification information by transmitting information including the type identification information to the another device via the external communication unit; and a communication controller that acquires information from the drive device on the basis of the setting information and transmits the information to a predetermined device.

According to the aspect according to the present invention, it is possible to reduce the cost required up to manufacture a communication device that is connected to a drive device for an automobile and the like and communicates with an external network.

BRIEF DESCRIPTION OF THE DRAWINGS

FIG. 6 is a view illustrating a specific example of a device information table stored in a device information storage.

DETAILED DESCRIPTION OF THE INVENTION

Figure 1:
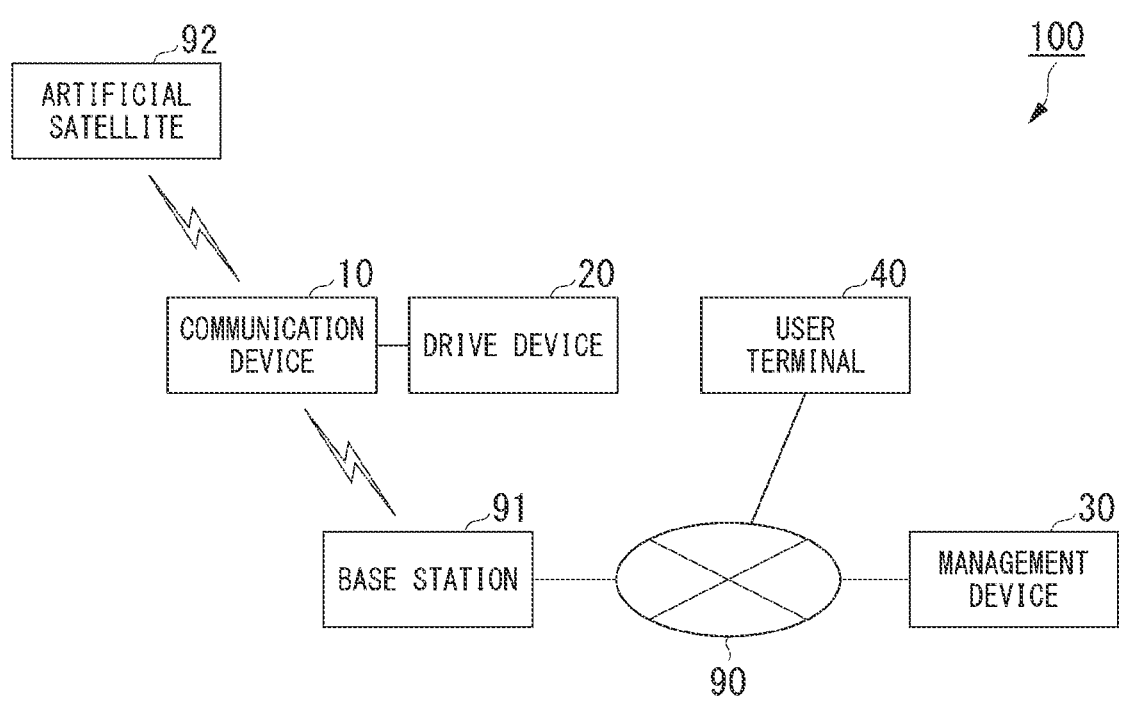
FIG. 1 is a schematic block diagram illustrating a system constitution of a drive device communication system according to an embodiment.

An embodiment will be described below in detail with reference to the accompanying drawings. The following embodiment does not limit the invention according to the claims, and all combinations of features described in the embodiment are not necessarily essential to the invention. Two or more features of a plurality of features described in the embodiment may be optionally combined. Identical or similar constitutions are denoted by identical reference numerals, and overlapping descriptions will be omitted.

FIG. 1 is a schematic block diagram illustrating the system constitution of a drive device communication system 100 according to an embodiment. First, an outline of the drive device communication system 100 will be described. The drive device communication system 100 includes a communication device 10, a drive device 20, and a management device 30. The communication device 10 is communicably connected to the drive device 20. The communication device 10 communicates with the management device 30 via a network 90. The communication device 10 may be connected to the network 90 via a base station 91, for example. The network 90 may be a network using wireless communication or a network using wired communication. The network 90 may be constituted by combining a plurality of networks. The communication device 10 may communicate with an artificial satellite 92. Each device will be described below in more detail. The drive device communication system 100 may be further provided with a user terminal 40. The user terminal 40 communicates with the management device 30 via the network 90, for example. Each device will be described below.

Figure 2:
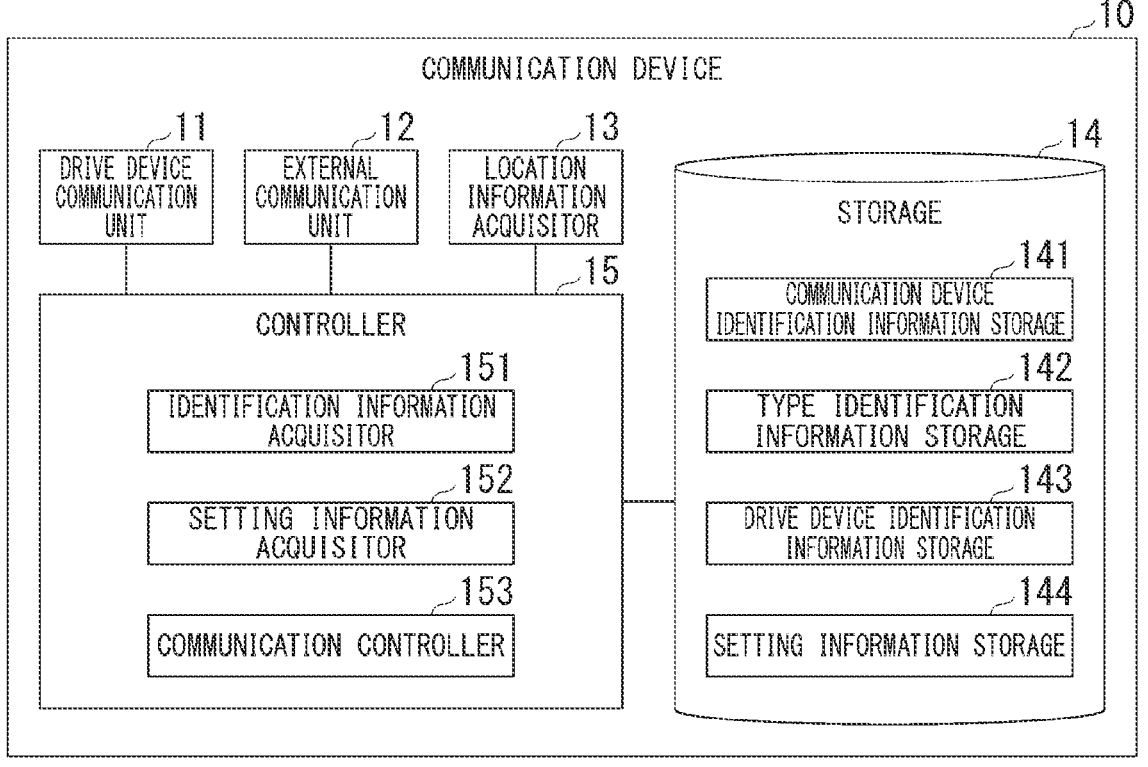
FIG. 2 is a view illustrating a specific example of a functional constitution of a communication device.

First, the communication device 10 will be described. FIG. 2 is a view illustrating a specific example of the functional constitution of the communication device 10. The communication device 10 is communicable information equipment. The communication device 10 may be, for example, a TCU or may be constituted as another communication device. The communication device 10 includes a drive device communication unit 11, an external communication unit 12, a location information acquisitor 13, a storage 14, and a controller 15.

The drive device communication unit 11 communicates with the drive device 20 to which the own device (communication device 10) is connected. More specifically, the drive device communication unit 11 may communicate with a control device (for example, an electronic control unit (ECU)) of the drive device 20. The drive device communication unit 11 may perform controller area network (CAN) communication with the drive device 20, for example.

The drive device communication unit 11 may be physically connected to the drive device 20 using a terminal, a plug, or the like. In this case, the drive device communication unit 11 may be constituted as a connector such as a terminal or a plug. The drive device communication unit 11 may be communicably connected to the drive device 20 by wire using a cable. In this case, the drive device communication unit 11 may be constituted as a communication interface including a connector to which a communication cable is connected. The drive device communication unit 11 may be communicably connected to the drive device 20 by wireless communication. In this case, the drive device communication unit 11 may be constituted as a communication interface that performs wireless communication with the drive device 20. The wireless communication performed between the drive device communication unit 11 and the drive device 20 may be, for example, short-range wireless communication (for example, Bluetooth (registered trademark)), a wireless local area network (LAN), Wi-Fi (registered trademark), or low power, wide area (LPWA).

The external communication unit 12 is a communication device communicably connected to the network 90, which is an example of an external network. The external communication unit 12 may be connected to the network 90, for example, by wirelessly communicating with the base station 91. The external communication unit 12 may be connected to the network 90 via the base station 91 using, for example, a 4G or 5G mobile communication technology. The external communication unit 12 communicates with another device via the network 90. For example, the external communication unit 12 communicates with the management device 30.

The location information acquisitor 13 acquires location information of the current location of the communication device 10. The location information acquisitor 13 acquires location information of the current location by communication with, for example, a satellite positioning system or a base station of a mobile phone network. Specific examples of the satellite positioning system include a global positioning system (GPS) and Galileo. The location information acquisitor 13 outputs the acquired location information to the controller 15.

The storage 14 includes a storage device such as a magnetic hard disk device or a semiconductor storage device. The storage 14 functions as a communication device identification information storage 141, a type identification information storage 142, a drive device identification information storage 143, and a setting information storage 144. The communication device identification information storage 141 stores identification information (communication device identification information) assigned to the own device (communication device 10). The communication device identification information is different for each communication device 10. That is, the communication device identification information is information uniquely indicating the communication device 10.

The type identification information storage 142 stores type identification information of the drive device 20 to which the own device (communication device 10) is connected. The type identification information is information indicating the type of the drive device 20 such as a model name, a product name, and a model number of the drive device 20 (that is, information having the same value among the drive devices 20 of the same type). The type identification information may further include information indicating the version of the drive device 20.

The drive device identification information storage 143 stores identification information (drive device identification information) of the drive device 20 to which the own device (communication device 10) is connected. The drive device identification information may be identification information of the drive device 20 itself, for example, or identification information of an ECU provided in the drive device 20. The drive device identification information is identification information uniquely given to each drive device 20 or ECU.

The setting information storage 144 stores setting information. The setting information is information used when the controller 15 of the communication device 10 operates, and includes information indicating the content of the operation of the controller 15. The setting information may be, for example, the following information.

Content and type of information (notification information) acquired from the drive device 20 by the communication device 10

Timing at which the communication device 10 acquires each piece of notification information from the drive device 20

Timing at which the communication device 10 starts to acquire each piece of notification information from the drive device 20

Timing at which the communication device 10 transmits notification information acquired from the drive device 20 to another device (for example, the management device 30)

Content of information to be transmitted to another device (for example, the management device 30) among the notification information acquired by the communication device 10 from the drive device 20

Content of determination processing performed by the communication device 10 on the basis of information acquired from the drive device 20

Timing at which the communication device 10 transmits information corresponding to a result of determination processing to another device (for example, the management device 30)

Timing at which the communication device 10 starts to transmit information corresponding to a result of determination processing to another device (for example, the management device 30)

Content of control of each piece of equipment included in the communication device 10 (for example, timing of activation)

For example, activation timing of the external communication unit 12 may be set by the setting information. At this time, this activation timing may be set to be different for each product. Such constitution can suppress cut.

The controller 15 includes a processor such as a central processing unit (CPU) and a memory. The processor executes a program, whereby the controller 15 functions as an identification information acquisitor 151, a setting information acquisitor 152, and a communication controller 153. All or some of the functions of the controller 15 may be implemented by using hardware such as an application specific integrated circuit (ASIC), a programmable logic device (PLD), or a field programmable gate array (FPGA). The program may be recorded in a computer-readable recording medium. The computer-readable recording medium is, for example, a portable medium such as a flexible disk, a magneto-optical disk, a ROM, a CD-ROM, or a semiconductor storage device (for example, a solid state drive (SSD)), or a storage device such as a hard disk or a semiconductor storage device built in a computer system. The program may be transmitted via a telecommunication line.

The identification information acquisitor 151 communicates with the drive device 20 via the drive device communication unit 11, and acquires the type identification information of the drive device 20 to which the own device (communication device 10) is connected. The identification information acquisitor 151 records the acquired type identification information into the type identification information storage 142. The identification information acquisitor 151 may acquire drive device identification information of the drive device 20 to which the own device is connected. The identification information acquisitor 151 records the acquired drive device identification information into the drive device identification information storage 143.

The setting information acquisitor 152 communicates with the management device 30 via the external communication unit 12 to acquire setting information. At this time, the setting information acquisitor 152 acquires the setting information corresponding to the type identification information stored in the type identification information storage 142. That is, the setting information acquisitor 152 acquires the setting information corresponding to the type of the drive device 20 to which the own device (communication device 10) is connected. At this time, the setting information acquisitor 152 may further acquire setting information (auxiliary setting information described below) corresponding to the drive device identification information of the drive device 20 to which the own device is connected. The setting information acquisitor 152 records the acquired setting information into the setting information storage 144.

The communication controller 153 operates on the basis of the setting information stored in the setting information storage 144. The communication controller 153 controls, for example, communication with the drive device 20 via the drive device communication unit 11, communication with the management device 30 via the external communication unit 12, and operation of the own device. The communication controller 153 operates in accordance with the setting information stored in the setting information storage 144.

Next, the drive device 20 will be described. The drive device 20 is a device including a drive machine such as an engine or a motor. The drive device 20 may be a device that moves by drive of the drive machine, or may be a device that includes the drive machine but does not move by itself. The drive device 20 may be, for example, an automobile that moves with people and objects on board, may be a work vehicle such as a lawn mower or a snow blower, may be a marine engine (outboard motor) attached to a ship and driven, a transport vehicle, a generator, a general-purpose engine, or another device. The work machine may include, for example, a drive machine for a work unit separately from the drive machine that generates the movement power, or may be equipped with a transmission that distributes the power of the drive machine that generates the movement power to the work unit. The drive device 20 may be provided with a control device such as an ECU. In this case, the control device such as an ECU controls the operation of the drive device 20 or controls components provided in the drive device 20. The power source connected to the drive device 20 may supply power to the communication device 10 connected to the own device (drive device 20). The control device of the drive device 20 transmits, to the communication device 10, information (hereinafter, referred to as "notification information") indicating the operation and state of the own device (the drive device 20) (including the operation and state of components of the own device) at a predetermined timing, for example. The timing at which the control device transmits notification information to the communication device 10 may be determined in the drive device 20 in advance, may be set by the communication device 10, or may be a timing at which an inquiry is received from the communication device 10. The content of the notification information may be determined in advance in the drive device 20, may be set by the communication device 10, or may be defined in an inquiry transmitted from the communication device 10. The timing and content of such notification information may be defined in the setting information received by the communication device 10 from the management device 30.

Figures 3, 4, 5:
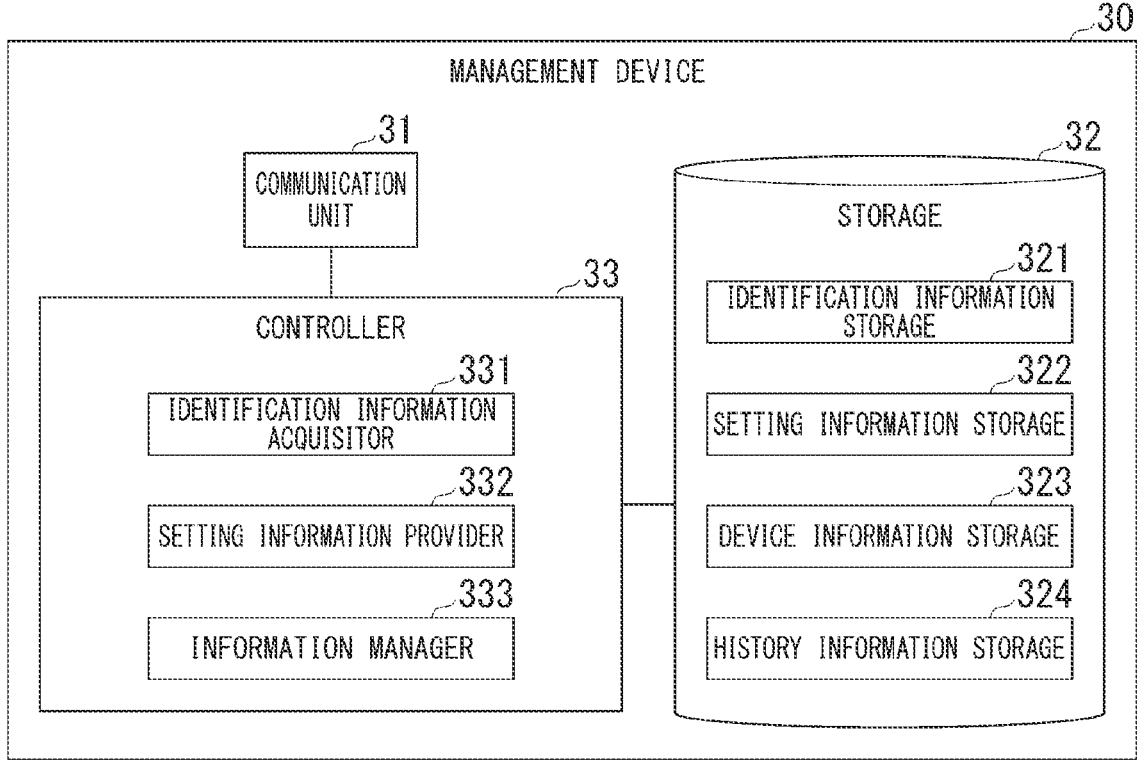
FIG. 3 is a view illustrating a specific example of a functional constitution of a management device.
FIG. 4 is a view illustrating a specific example of an identification information table stored in an identification information storage.
FIG. 5 is a view illustrating a specific example of a setting information table stored in a setting information storage.

Next, the management device 30 will be described. FIG. 3 is a view illustrating a specific example of the functional constitution of the management device 30. The management device 30 includes an information processing device such as a personal computer or a server device. The management device 30 includes a communication unit 31, a storage 32, and a controller 33.

The communication unit 31 is a communication device communicably connected to the network 90. The communication unit 31 communicates with another device via the network 90. For example, the communication unit 31 communicates with the communication device 10 and the user terminal 40.

The storage 32 includes a storage device such as a magnetic hard disk device or a semiconductor storage device. The storage 32 functions as an identification information storage 321, a setting information storage 322, a device information storage 323, and a history information storage 324.

FIG. 4 is a view illustrating a specific example of an identification information table stored in the identification information storage 321. The identification information table has a plurality of identification information records. The identification information record has values of communication device identification information and type identification information. The communication device identification information indicates the identification information of the communication device 10. The type identification information indicates the type of the drive device 20 to which the communication device 10 indicated by the communication device identification information of the same identification information record is connected. That is, the communication device 10 indicated by the communication device identification information included in the identification information record is connected to the drive device 20 of the type indicated by the type identification information included in the same identification information record. The identification information record may further have a value of the drive device identification information. In this case, the communication device identification information, the type identification information, and the drive device identification information are stored in association with one another.

FIG. 5 is a view illustrating a specific example of a setting information table stored in the setting information storage 322. The setting information table has a plurality of setting information records. The setting information record has values of type identification information and setting information. The type identification information indicates the type of the drive device 20. The setting information is setting information to be applied to the communication device 10 connected to the drive device 20 of the type indicated by the type identification information of the same setting information record. One setting information record may include one piece or a plurality of pieces of type identification information.

The device information storage 323 stores a device information table. The device information table includes a plurality of device information records. The device information record includes information indicating a history of the state of the drive device 20, and information indicating setting for the drive device 20, operation of the drive device 20, and the like. FIG. 6 is a view illustrating a specific example of a device information table stored in the device information storage 323. In the example of FIG. 6, the device information record has values of drive device identification information, failure information, and auxiliary setting information. The drive device identification information is identification information of the drive device 20. The failure information is information indicating a failure occurred in the past or a failure currently occurring in the drive device 20 indicated by the drive device identification information of the same device information record. The failure information may indicate the type of failure and the occurrence date and time of the failure. The auxiliary setting information indicates setting information additionally set in addition to the normally applied setting information for the drive device 20 indicated by the drive device identification information of the same setting information record. The auxiliary setting information may be automatically set by the controller 33 in accordance with, for example, failure information of the drive device 20, or may be set on the basis of information received from a terminal device (user terminal 40) of an owner of the drive device 20.

The history information storage 324 records a history of information transmitted from the communication device 10. For example, the communication device 10 transmits the notification information acquired from the drive device 20 to the management device 30 at a predetermined timing on the basis of the setting information stored in the own device. The history information storage 324 stores the notification information transmitted from each communication device 10. For example, the history information storage 324 may store the communication device identification information of the communication device 10, the drive device identification information of the drive device 20, the notification information acquired from the drive device 20, and the information indicating the date and time in association with one another. For example, the communication device 10 generates error report information on the basis of error information received from the drive device 20 and transmits the error report information to the management device 30. The history information storage 324 stores the error report information transmitted from each communication device 10.

The controller 33 includes a processor such as a CPU and a memory. The processor executes a program, whereby the controller 33 functions as an identification information acquisitor 331, a setting information provider 332, and an information manager 333. All or some of the functions of the controller 33 may be implemented by using hardware such as an ASIC, a PLD, or an FPGA. The program may be recorded in a computer-readable recording medium. The computer-readable recording medium is, for example, a portable medium such as a flexible disk, a magneto-optical disk, a ROM, a CD-ROM, or a semiconductor storage device (for example, a solid state drive (SSD)), or a storage device such as a hard disk or a semiconductor storage device built in a computer system. The program may be transmitted via a telecommunication line.

The identification information acquisitor 331 communicates with the communication device 10 via the communication unit 31, and acquires identification information (communication device identification information) of the communication device 10 and type identification information of the drive device 20 to which the communication device 10 is connected. The identification information acquisitor 331 records, into the identification information storage 321, the acquired communication device identification information and type identification information in association with each other.

Upon receiving a request for the setting information from the communication device 10, the setting information provider 332 reads, from the setting information storage 322, the setting information corresponding to the type of the drive device 20 to which the communication device 10 is connected. For example, in a case where the type identification information is received at the time of requesting the setting information, the setting information provider 332 reads the setting information recorded in the setting information storage 322 in association with the type identification information. Then, the setting information provider 332 transmits the read setting information to the communication device 10 of the request source.

The request for the setting information may include the drive device identification information of the drive device 20 to which the communication device 10 of the transmission source is connected. In this case, the setting information provider 332 determines whether or not the drive device identification information of the request target is registered, in association with the auxiliary setting information, in the device information record stored in the device information storage 323. In a case where such auxiliary setting information is registered, the setting information provider 332 reads the auxiliary setting information and transmits the auxiliary setting information to the communication device 10 of the request source.

The information manager 333 manages information stored in the device information storage 323 and information stored in the history information storage 324. For example, the information manager 333 manages the auxiliary setting information stored in the device information storage 323. For example, the information manager 333 may register or change the auxiliary setting information for a specific drive device 20 on the basis of change information transmitted from the user terminal 40. Such change information includes the auxiliary setting information and the drive device identification information. On the basis of the received change information, the information manager 333 may newly register the device information record recorded in the device information storage 323, or may update the already registered device information. When the failure information is registered in the device information storage 323, the information manager 333 may register the auxiliary setting information in accordance with the failure information. A rule (association) as to what auxiliary setting information is registered in a case what failure information is registered may be determined in advance.

The information manager 333 receives the notification information and the error report information transmitted from each communication device 10 and records them into the history information storage 324. For example, the information manager 333 may record, into the history information storage 324 in association with one another, the communication device identification information of the communication device 10, the drive device identification information of the drive device 20, the notification information or the error report information acquired from the drive device 20, and the information indicating the date and time. The information manager 333 may determine whether or not a failure has occurred in each drive device 20 on the basis of the information stored in the history information storage 324. The failure determination criterion may be determined in advance. Upon determining that a failure has occurred, the information manager 333 registers the drive device identification information of the drive device 20 that is the determination target and the information indicating the determined failure into the device information storage 323 in association with each other.

Figure 7:
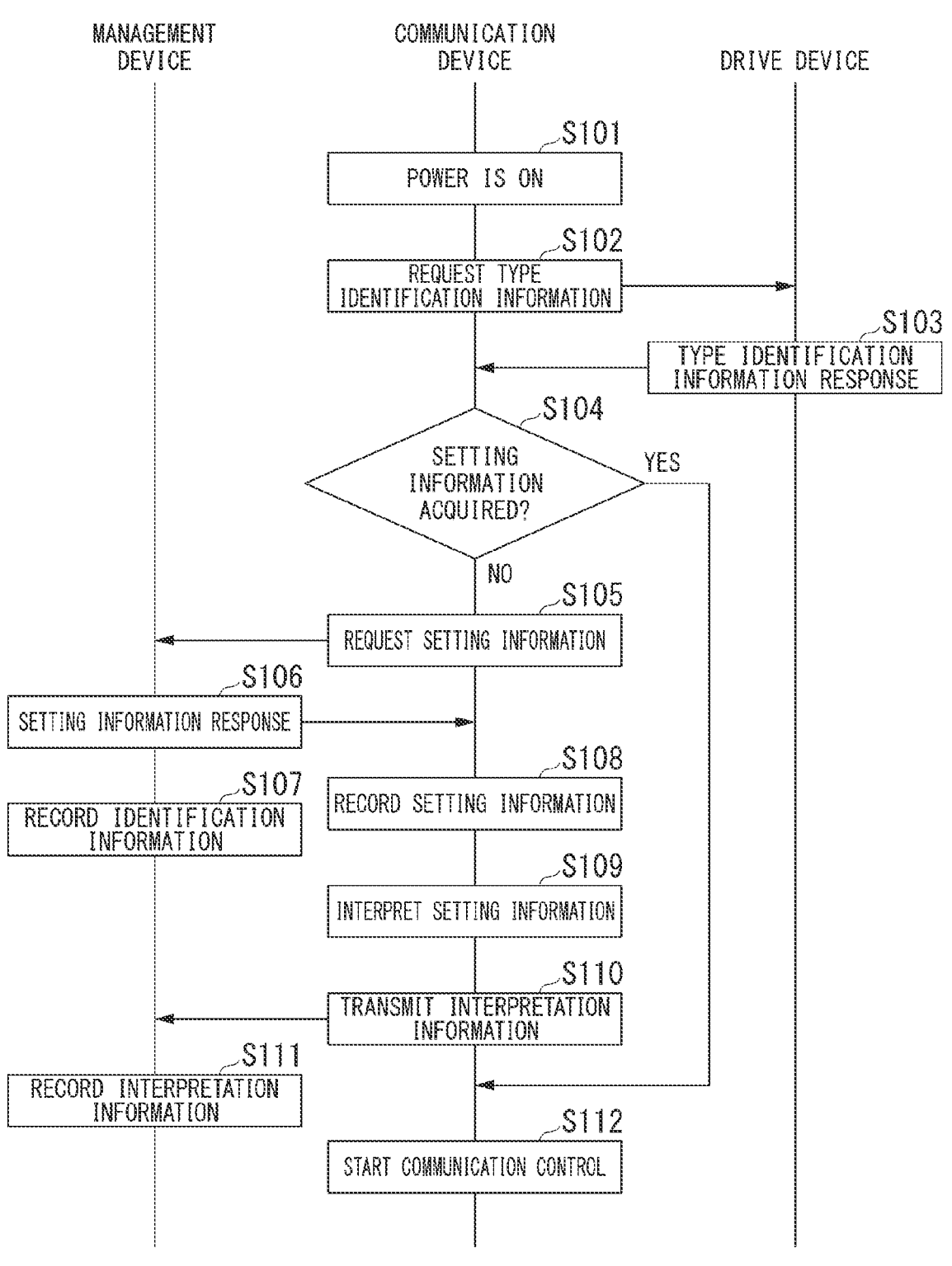
FIG. 7 is a sequence chart illustrating a specific example of a flow of an initial operation when a power source of the communication device is turned on in the drive device communication system.

FIG. 7 is a sequence chart illustrating a specific example of the flow of the initial operation when the power source of the communication device 10 is turned on in the drive device communication system 100. For example, it may be constituted such that when the power source is turned on in the drive device 20 to which the communication device 10 is connected, power is supplied from the drive device 20 to the communication device 10, and the communication device 10 is turned on and activated. When the communication device 10 is turned on and activated (step S101), the identification information acquisitor 151 requests, from the drive device 20, the type identification information of the drive device 20 to which the own device (communication device) is connected (step S102).

The control device (for example, ECU) of the drive device 20 transmits, to the communication device 10, a type identification information response including the type identification information of the own device (drive device 20) (step S103). The setting information acquisitor 152 determines whether or not the setting information corresponding to the type of the drive device 20 to which the own device (communication device 10) is connected has already been registered in the setting information storage 144 (step S104). For example, when the type identification information stored in the type identification information storage 142 matches the type identification information received in step S103 and the setting information is stored in the setting information storage 144, it may be determined that the setting information corresponding to the type of the drive device 20 to which the own device (communication device 10) is connected has already been registered in the setting information storage 144. In a case where the setting information has already been registered (step S104—YES), the setting information acquisitor 152 of the communication device 10 does not execute processing for acquiring the setting information from the management device 30, and the communication controller 153 starts communication control using the setting information stored in the setting information storage 144 (step S112).

On the other hand, in a case where the setting information corresponding to the drive device 20 to which the own device (communication device 10) is connected has not yet been registered in the setting information storage 144 (step S104—NO), the setting information acquisitor 152 generates and transmits, to the management device 30, a setting information request (step S105). The setting information request includes at least, for example, information indicative of requesting the setting information, identification information (communication device identification information) of the own device (communication device 10), and type identification information of the drive device 20 to which the own device is connected. The setting information request may further include drive device identification information.

Upon receiving the setting information request, the setting information provider 332 of the management device 30 reads the setting information stored in the setting information storage 322 in association with the type identification information included in the received setting information request. The setting information provider 332 reads the auxiliary setting information stored in the device information storage 323 in association with the drive device identification information included in the received setting information request. The setting information provider 332 generates a setting information response including the read setting information and auxiliary setting information. Then, the setting information provider 332 transmits the generated setting information response to the communication device 10 of the request source of the setting information (step S106).

The identification information acquisitor 331 of the management device 30 registers, into the identification information storage 321, the communication device identification information and the type identification information included in the received setting information request in association with each other (step S107). At this time, in a case where another identification information record having the same value of the communication device identification information has already been registered, the identification information record may be deleted and a new identification information record may be registered, or the type identification information of the identification information record may be updated.

Upon receiving the setting information response, the setting information acquisitor 152 of the communication device 10 registers the received setting information into the setting information storage 144. At this time, the setting information acquisitor 152 also registers the auxiliary setting information included in the received setting information response into the setting information storage 144 as the setting information (step S108). The setting information acquisitor 152 interprets the registered setting information (including the auxiliary setting information) (step S109). The interpretation is processing of determining how to operate on the basis of the setting information. The setting information acquisitor 152 transmits information (hereinafter referred to as "interpretation information") indicating a result of the interpretation to the management device 30 (step S110). Then, the communication controller 153 starts communication control by using the setting information stored in the setting information storage 144 (step S112).

Upon receiving the interpretation information, the setting information provider 332 of the management device 30 records the received interpretation information into the history information storage 324 (step S111).

Next, a first specific example of communication control based on the setting information will be described. For example, in a case where the drive device 20 is a work machine (for example, a lawn mower), the communication device 10 may operate as follows on the basis of the setting information. Here, the work machine includes a work unit (a blade of a lawn mower, an auger of a snow blower, a propeller of an outboard motor, and the like) controlled by the control device of the drive device 20 or operated by a user.

While the drive device 20 is in predetermined operation (for example, lawn mowing operation) as a work machine (hereinafter, referred to as "in operation"), the communication device 10 may transmit the information acquired from the drive device 20 to the management device 30 in a first transmission cycle. While the drive device 20 is not in predetermined operation as a work machine (for example, charging: hereinafter referred to as "not in operation"), the communication device 10 may transmit the information acquired from the drive device 20 to the management device 30 in a second transmission cycle. In this case, the first transmission cycle may be set as a cycle shorter than the second transmission cycle. At this time, in addition to the information acquired from the drive device 20, the communication device 10 may further transmit the location information acquired by the location information acquisitor 13 to the management device 30. For example, the setting information may include information defining "in operation" as to what state the drive device 20 is in and "not in operation" as to what state the drive device 20 is in. That is, information indicating a condition (state determination condition) for determining the state of the drive device 20 may be included in the setting information. As the state of the drive device 20, other states in operation and not in operation may be defined.

The notification information acquired by the communication device 10 from the drive device 20 may include, for example, one or more among the rotation speed per unit time of the engine, the presence or absence of rotation of a mowing blade, the rotation speed per unit time of the mowing blade, and the measurement value of a thermometer installed around the engine. In a case where the drive device 20 includes a motor, the rotation speed per unit time of the motor, a voltage value applied to the motor, a current value of the motor, and the like may be acquired from the drive device 20 by the communication device 10. In particular, when the drive device 20 is a work machine, information regarding a driver (an engine or a motor) mounted on the work machine may be used as the notification information. In particular, when the drive device 20 is a work machine, information regarding a driver (an engine or a motor) that drives the work unit (a blade of a lawn mower, an auger of a snow blower, a propeller of an outboard motor, and the like) mounted on the work machine may be used as the notification information. In a case where the drive device 20 includes a battery, a variation value of the battery capacity or the like may be acquired from the drive device 20 by the communication device 10.

The notification information acquired by the communication device 10 from the drive device 20 may be different between when in operation and when not in operation. The definition of this predetermined operation may be defined in the setting information. The predetermined operation is an operation accompanied by movement of the drive device 20 in a part or the whole thereof, and the drive device 20 may be in a state of not moving while the predetermined operation is not executed. Such constitution makes it possible to reduce the possibility that the location becomes unknown during a predetermined operation, and reduce the power consumption by reducing the communication frequency in a period (during not in operation, for example, during charging) in which the possibility that the location becomes unknown is originally low.

Next, a second specific example of communication control based on the setting information will be described. For example, when the occurrence frequency of a failure in the drive device 20 exceeds a predetermined threshold, the notification information may be transmitted in a relatively short cycle. When the occurrence frequency of the failure does not exceed the predetermined threshold, the notification information may be transmitted in a relatively long cycle. The predetermined threshold may be defined in the setting information. The frequency of failure may be determined by the communication controller 153, for example. In this case, the communication controller 153 may record, into the storage 14, information (for example, date and time) indicating the timing at which the information (error information) indicating the failure is acquired from the drive device 20, and determine the frequency of the failure on the basis of the content of the record.

Next, a third specific example of communication control based on the setting information will be described. For example, the setting information may be defined such that the notification information regarding the drive device 20 is stored in the communication device 10 for a predetermined time backward from the current time until a predetermined failure occurs in the drive device 20, and the notification information after the time point backward by the predetermined time and the notification information obtained from the drive device 20 thereafter are transmitted to the management device 30 at the time point when the predetermined failure occurs.

Next, a fourth specific example of communication control based on the setting information will be described. For example, the setting information may be defined such that a predetermined part of the function of the communication device 10 is not activated until the drive device 20 is brought into a predetermined state indicating that the drive device 20 becomes in operation. The predetermined part of the function may be, for example, the external communication unit 12 of the communication device 10 or the location information acquisitor 13. The predetermined state indicating that the drive device 20 becomes in operation may be, for example, a state in which the engine of the drive device 20 is in operation (state in which cranking is completed).

In the drive device communication system 100 constituted as described above, the setting information defining the operation of the communication device 10 is provided from the management device 30 to the communication device 10 in accordance with the type of the drive device 20 to which the communication device 10 is connected. Therefore, it is not necessary to design the communication device 10 in advance in accordance with the type of the drive device 20, and the communication device 10 can be designed as a device common to a plurality of drive devices 20. Therefore, in the communication device 10 connected to the drive device 20 to communicate with an external network, it is possible to reduce the cost required until manufacturing.

The auxiliary setting information corresponding to the individual pieces of drive device identification information can be registered in the device information storage 323. Such registration can be performed by operating the user terminal 40, for example. Therefore, the user of each drive device 20 can set the communication device 10 so as to individually perform an operation in accordance with the user's own preference or circumstances by the operation of the user terminal 40.

Modifications

The device information storage 323 may store communication device identification information instead of the drive device identification information. In the device information storage 323, the drive device identification information and the communication device identification information may be registered in association with each other.

The management device 30 is not necessarily constituted as one device. For example, the management device 30 may include a plurality of information processing devices. The plurality of information processing devices constituting the management device 30 may be communicably connected via a communication path such as the network 90, and may be constituted as a system such as a cluster machine or a cloud.

SUMMARY OF EMBODIMENT

The above embodiment discloses at least the following communication device and management device.

1. A communication device (for example, 10) of the above embodiment includes:

a drive device communication unit (for example, 11) that communicates with a drive device (for example, 20) to which an own device is connected;

an external communication unit (for example, 12) that communicates with another device (for example, 30) via a network (for example, 90);

an identification information acquisitor (for example, 151) that acquires type identification information indicating a type of a drive device from the drive device connected to the drive device communication unit;

a setting information acquisitor (for example, 152) that acquires, from another device, setting information corresponding to the type identification information by transmitting information including the type identification information to the another device via the external communication unit; and a communication controller (for example, 153) that acquires information from the drive device on the basis of the setting information and transmits the information to a predetermined device.

According to this embodiment, it becomes possible to apply one type of communication device to multiple types of drive devices, and as a result, it becomes possible to reduce the cost required up to manufacturing of the communication device.

2. According to the above embodiment, the identification information acquisitor acquires the type identification information from the drive device when the own device is activated.

According to this embodiment, it becomes not necessary for the user to manually set the setting information when the communication device is attached to the drive device.

3. According to the above embodiment, a storage (for example, 144) that stores the setting information is further included and, the setting information acquisitor does not acquire the setting information from the another device when the storage stores setting information corresponding to type identification information acquired by the identification information acquisitor.

According to this embodiment, it becomes possible to prevent the processing of acquiring the setting information again from being performed even though the setting information has been acquired, and to suppress the communication amount.

4. According to the above embodiment, the setting information includes information indicating a state determination condition that is a condition for determining a state of the drive device.

According to this embodiment, it becomes possible to suppress the communication amount by transmitting appropriate information in accordance with the state of the drive device.

5. According to the above embodiment, the setting information includes information regarding information acquired by the communication controller from the drive device.

According to this embodiment, it becomes possible to transmit only necessary data for each type of drive device, and it becomes possible to suppress the communication amount.

6. According to the above embodiment, the setting information includes information indicating a timing at which the communication controller transmits the information to the predetermined device via the external communication unit.

According to this embodiment, it becomes possible to suppress the communication amount by transmitting information at an appropriate timing in accordance with the type of the drive device. It is possible to suppress cut by changing the activation timing of the external communication unit for each product.

7. According to the above embodiment, the identification information acquisitor further acquires, from the drive device, drive device identification information uniquely indicating the drive device, and the communication controller transmits, to the predetermined device, the drive device identification information and communication device identification information that is identification information of the own device.

According to this embodiment, in a case where one communication device is used in a certain drive device before used in another drive device of the same type, it becomes possible to determine the fact in a predetermined device. Accordingly, it becomes possible to provide different setting information between a certain drive device and another drive device.

8. A management device (for example, 30) of the above embodiment includes:

a controller (for example, 33) that receives the device identification information and the communication device identification information from the communication device (for example, 10) and records, into a storage (for example, 32) in association with each other, the device identification information and the communication device identification information that have been received.

According to this embodiment, in a case where one communication device is used in a certain drive device before used in another drive device of the same type, it becomes possible to determine the fact in a management device.

9. According to the above embodiment, the controller receives auxiliary setting information that is a part of the setting information in association with the drive device identification information from a user terminal (for example, 40), and records, into the storage (for example, 32), the drive device identification information and the auxiliary setting information in association with each other.

According to this embodiment, by storing the drive device identification information and the auxiliary setting information in association with each other, it becomes possible to provide different setting information for each drive device.

10. In a communication method of the above embodiment,

a communication device including a drive device communication unit (for example, 11) that communicates with a drive device (for example, 20) to which an own device is connected, and an external communication unit (for example, 12) that communicates with another device (for example, 30) via a network (for example, 90) performs an identification information acquisition step of acquiring type identification information indicating a type of a drive device from the drive device connected to the drive device communication unit, a setting information acquisition step of acquiring, from another device, setting information corresponding to the type identification information by transmitting information including the type identification information to the another device via the external communication unit, and a communication control step of acquiring information from the drive device on the basis of the setting information and transmitting the information to a predetermined device.

11. A computer program of the above embodiment is a computer program for causing a computer including a drive device communication unit (for example, 11) that communicates with a drive device (for example, 20) to which an own device is connected, and an external communication unit (for example, 12) that communicates with another device (for example, 30) via a network (for example, 90)

to function as a communication device including an identification information acquisitor that acquires type identification information indicating a type of a drive device from the drive device connected to the drive device communication unit, a setting information acquisitor that acquires, from another device, setting information corresponding to the type identification information by transmitting information including the type identification information to the another device via the external communication unit, and a communication controller that acquires information from the drive device on the basis of the setting information and transmits the information to a predetermined device.

12. A management method of the above embodiment includes:

a step in which a management device (for example, 30) receives the device identification information and the communication device identification information from the communication device (for example, 10); and a recording step in which the management device records, into a storage (for example, 32) in association with each other, the device identification information and the communication device identification information that have been received.

13. A computer program of the above embodiment is a computer program for causing a computer to function as a management device (for example, 30) including a controller that receives the device identification information and the communication device identification information from the communication device (for example, 10), and records, into a storage (for example, 32) in association with each other, the device identification information and the communication device identification information that have been received.

While the modes for carrying out the present invention have been described above using the embodiment, the present invention is not limited to the embodiment described above, and various modifications and substitutions are possible within a range not departing from the gist of the present invention. Embodiments obtained by appropriately combining technical means disclosed in different embodiments are also included in the technical scope of the present invention.

What is claimed is:

1. A communication device comprising:

a drive device communication unit that communicates with a drive device to which the communication device is connected, the drive device including a drive machine such as an engine or a motor, wherein the drive device is driven to move by the drive machine, or the drive device includes the drive machine but does not move by itself;

an external communication unit that communicates with another device via a network;

an identification information acquisitor that acquires type identification information indicating a type of a drive device from the drive device connected to the drive device communication unit;

a setting information acquisitor that acquires, from another device, setting information corresponding to the type identification information by transmitting information including the type identification information to the another device via the external communication unit; and a communication controller that acquires information from the drive device on a basis of the setting information and transmits the information to a predetermined device.

2. The communication device according to claim 1, wherein the identification information acquisitor acquires the type identification information from the drive device when the communication device is activated.

3. The communication device according to claim 1, further comprising:

a storage that stores the setting information, wherein the setting information acquisitor does not acquire the setting information from the another device when the storage stores setting information corresponding to type identification information acquired by the identification information acquisitor.

4. The communication device according to claim 1, wherein the setting information includes information indicating a state determination condition that is a condition for determining a state of the drive device.

5. The communication device according to claim 1, wherein the setting information includes information regarding information acquired by the communication controller from the drive device.

6. The communication device according to claim 1, wherein the setting information includes information indicating a timing at which the communication controller transmits the information to the predetermined device via the external communication unit.

7. The communication device according to claim 1, wherein the identification information acquisitor further acquires, from the drive device, drive device identification information uniquely indicating the drive device, and the communication controller transmits, to the predetermined device, the drive device identification information and communication device identification information that is identification information of the communication device.

8. A management device comprising a controller that receives the device identification information and the communication device identification information from the communication device according to claim 7, and records, into a storage in association with each other, the device identification information and the communication device identification information that have been received.

9. The management device according to claim 8, wherein the controller receives auxiliary setting information that is a part of the setting information in association with the drive device identification information from a user terminal, and records, into the storage, the drive device identification information and the auxiliary setting information in association with each other.

10. A management method, comprising:
a step in which a management device receives the device identification information and the communication device identification information from the communication device according to claim 7, and
a recording step in which the management device records, into a storage in association with each other, the device identification information and the communication device identification information that have been received.

11. A non-transitory computer-readable recording medium comprising a computer program for causing a computer to function as a management device including a controller that receives the device identification information and the communication device identification information from the communication device according to claim 7, and records, into a storage in association with each other, the device identification information and the communication device identification information that have been received.

12. A communication method, wherein
a communication device including a drive device communication unit that communicates with a drive device that includes a drive machine such as an engine or a motor to which the communication device is connected, and an external communication unit that communicates with another device via a network, wherein the drive device is driven to move by the drive machine, or the drive device includes the drive machine but does not move by itself, and performs
an identification information acquisition step of acquiring type identification information indicating a type of a drive device from the drive device connected to the drive device communication unit,
a setting information acquisition step of acquiring, from another device, setting information corresponding to the type identification information by transmitting information including the type identification information to the another device via the external communication unit, and
a communication control step of acquiring information from the drive device on a basis of the setting information and transmitting the information to a predetermined device.

13. A non-transitory computer-readable recording medium comprising a computer program for causing
a computer including a drive device communication unit that communicates with a drive device that includes a drive machine such as an engine or a motor to which a communication device is connected, and an external communication unit that communicates with another device via a network, wherein the drive device is driven to move by the drive machine, or the drive device includes the drive machine but does not move by itself,
to function as a communication device including
an identification information acquisitor that acquires type identification information indicating a type of a drive device from the drive device connected to the drive device communication unit,
a setting information acquisitor that acquires, from another device, setting information corresponding to the type identification information by transmitting information including the type identification information to the another device via the external communication unit, and
a communication controller that acquires information from the drive device on a basis of the setting information and transmits the information to a predetermined device.

* * * * *